(12) United States Patent
Aoki et al.

(10) Patent No.: US 12,447,761 B2
(45) Date of Patent: Oct. 21, 2025

(54) HEAD LIFTING LOWERING DEVICE, CONTROL METHOD OF HEAD LIFTING LOWERING DEVICE, NON-TRANSITORY COMPUTER-READABLE STORAGE MEDIUM STORING PROGRAM, MANUFACTURING METHOD OF HEAD LIFTING LOWERING DEVICE

(71) Applicant: SEIKO EPSON CORPORATION, Tokyo (JP)

(72) Inventors: Takeshi Aoki, Matsumoto (JP); Yusaku Amano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/318,116

(22) Filed: May 16, 2023

(65) Prior Publication Data

US 2023/0278355 A1     Sep. 7, 2023

Related U.S. Application Data

(62) Division of application No. 17/482,913, filed on Sep. 23, 2021.

(30) Foreign Application Priority Data

Sep. 29, 2020   (JP) ................................ 2020-163276

(51) Int. Cl.
  *B41J 25/304*   (2006.01)
  *B41J 2/14*    (2006.01)
  *B41J 25/00*   (2006.01)

(52) U.S. Cl.
  CPC ............. *B41J 25/304* (2013.01); *B41J 2/14* (2013.01); *B41J 25/001* (2013.01)

(58) Field of Classification Search
  None
  See application file for complete search history.

(56) References Cited

U.S. PATENT DOCUMENTS

| 6,457,800 | B1* | 10/2002 | Bohm | .................... B41J 25/003 |
| | | | | 347/42 |
| 8,136,916 | B2* | 3/2012 | Nemoto | ............... B41J 2/16585 |
| | | | | 347/42 |
| 2006/0290763 | A1 | 12/2006 | Kawaguchi et al. | |
| 2013/0162707 | A1* | 6/2013 | Kitaoka | ................. B41J 25/304 |
| | | | | 347/9 |
| 2017/0232767 | A1 | 8/2017 | Togashi | |
| 2018/0178565 | A1* | 6/2018 | Kato | ........................ H04N 1/31 |
| 2018/0236797 | A1* | 8/2018 | Ohashi | ................. B41J 2/16585 |

FOREIGN PATENT DOCUMENTS

| JP | 2019142030 A | 8/2019 |
| JP | 2020049788 A | 4/2020 |

OTHER PUBLICATIONS

Office Action for JP Patent Application No. JP2020163276, issued on Mar. 19, 2024, 8 pages of Office Action.

* cited by examiner

*Primary Examiner* — Alejandro Valencia
(74) *Attorney, Agent, or Firm* — CHIP LAW GROUP

(57) ABSTRACT

A head lifting lowering device includes: a lifting lowering mechanism that moves a liquid ejecting head, which ejects a liquid, in a first direction in which the liquid ejecting head is lifted/lowered; a frame that supports the lifting lowering mechanism; and an adjusting member that moves the lifting lowering mechanism relative to the frame in a second direction different from the first direction.

14 Claims, 12 Drawing Sheets

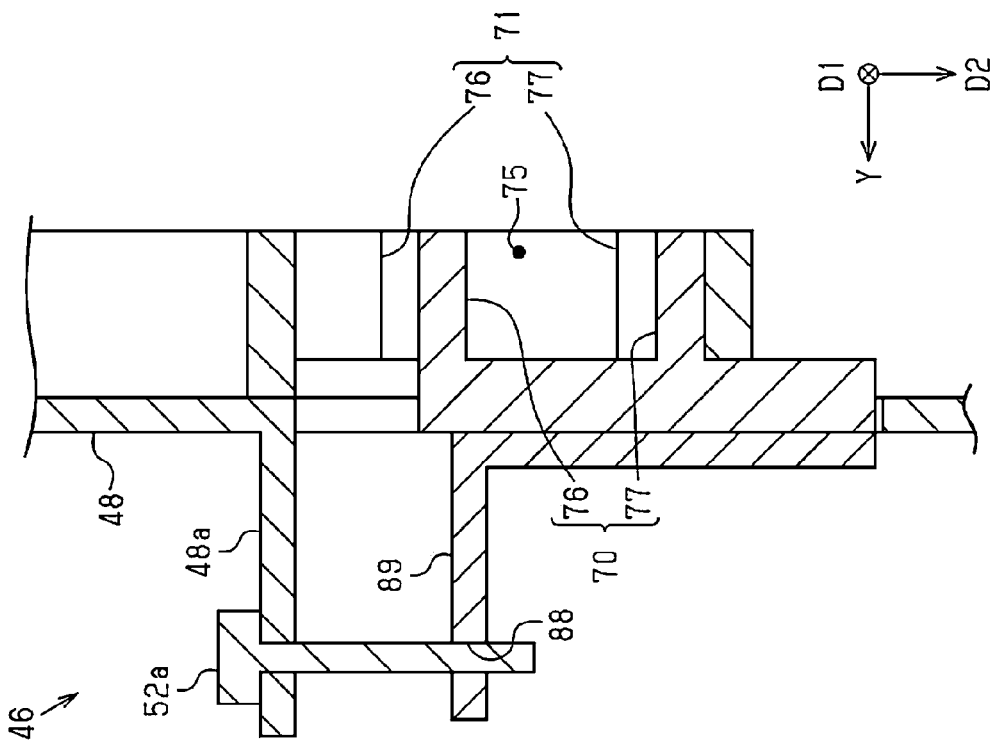
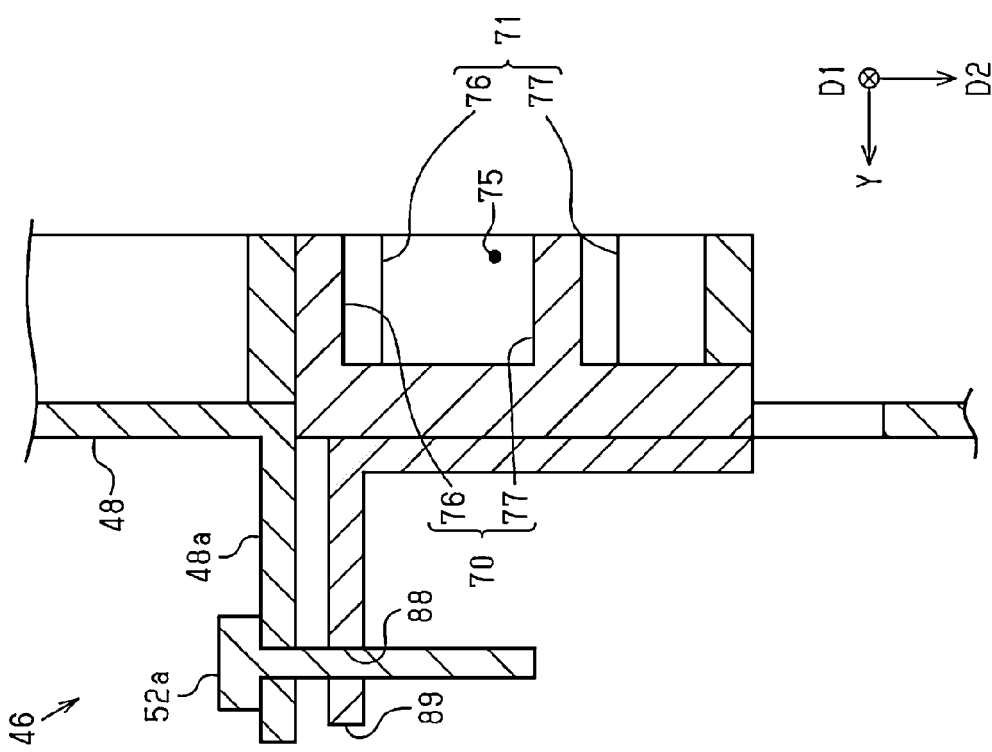

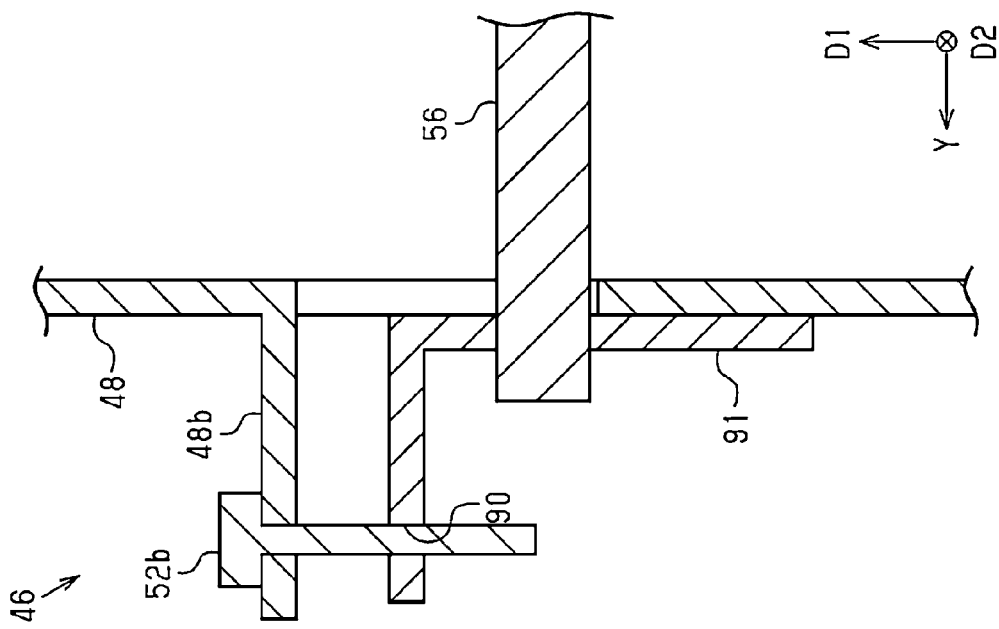
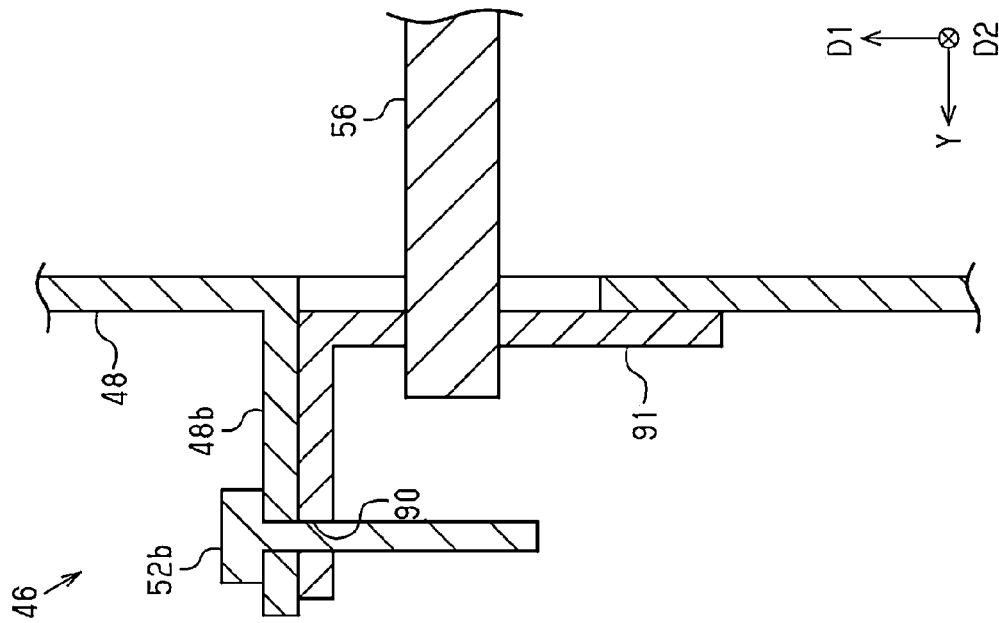

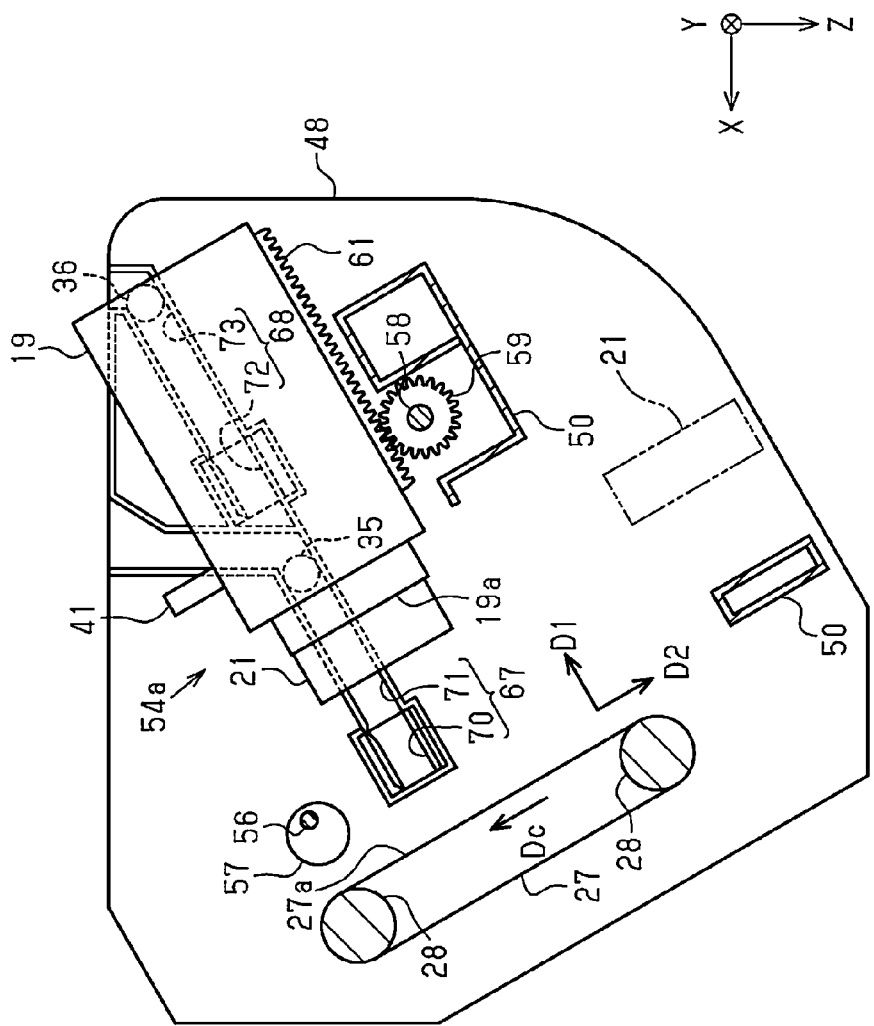

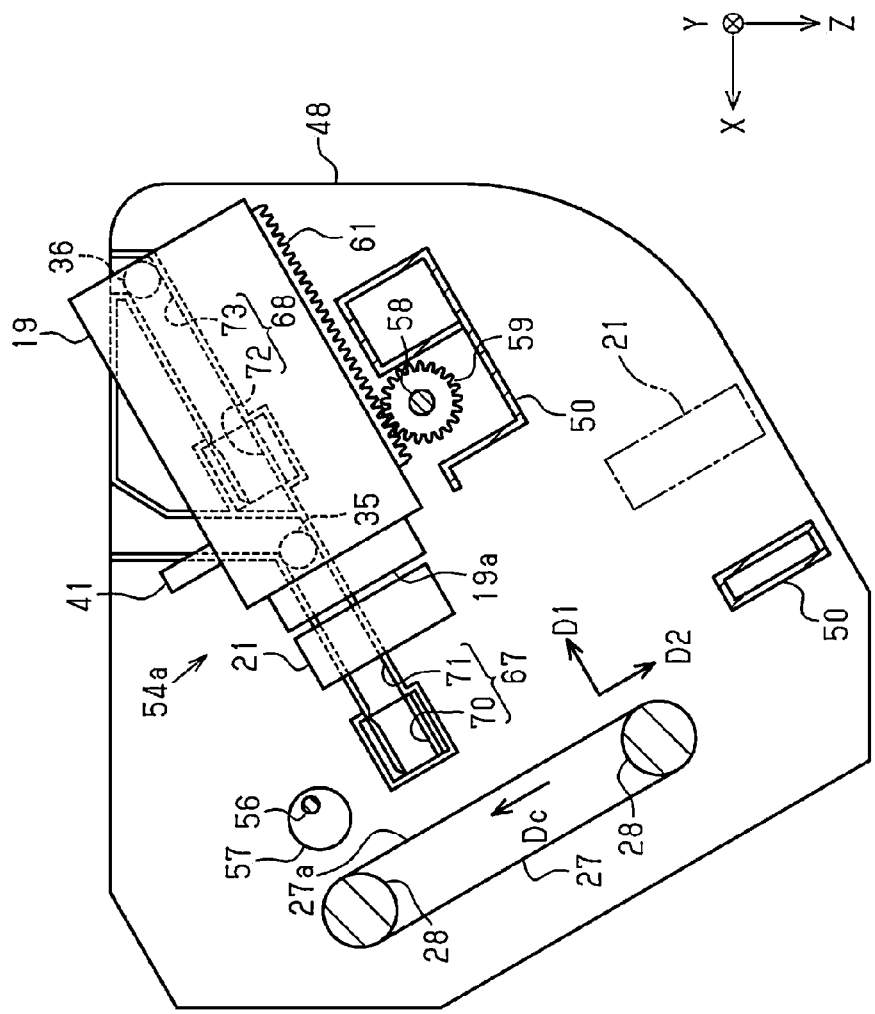

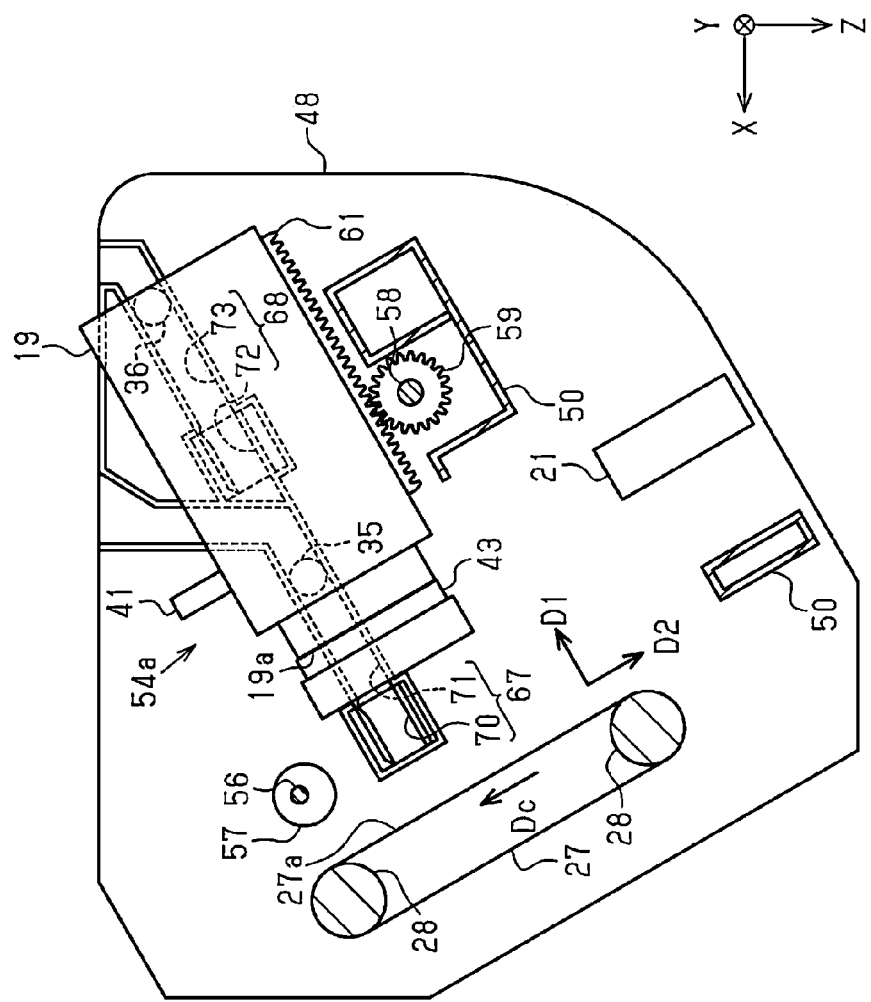

HEAD LIFTING LOWERING DEVICE, CONTROL METHOD OF HEAD LIFTING LOWERING DEVICE, NON-TRANSITORY COMPUTER-READABLE STORAGE MEDIUM STORING PROGRAM, MANUFACTURING METHOD OF HEAD LIFTING LOWERING DEVICE

This application is a divisional application of U.S. patent application Ser. No. 17/482,913, filed on Sep. 23, 2021, which claims priority from JP Application Serial Number 2020-163276, filed Sep. 29, 2020. Each of the above-referenced applications is hereby incorporated herein by reference in its entirety.

BACKGROUND

1. Technical Field

The present disclosure relates to a head lifting lowering device, a control method of the head lifting lowering device, a non-transitory computer-readable storage medium storing a program, and a manufacturing method of the head lifting lowering device.

2. Related Art

For example, as described in JP-A-2020-49788, there are recording devices, which are examples of a head lifting lowering device, for adjusting a position of a recording head, which is an example of a liquid ejecting head. The recording head is provided to be movable in the Z direction while being positioned in the X direction and the Y direction by using a reference hole. The Z direction is a direction perpendicular to a surface on which ink lands. When the recording head is lifted/lowered relative to the surface on which ink lands, a gap between the recording head and a medium is adjusted.

The position of such a recording head is adjustable in the direction perpendicular to the surface on which ink lands but is difficult to adjust in other directions.

SUMMARY

A head lifting lowering device includes: a lifting lowering mechanism that moves a liquid ejecting head, which ejects a liquid, in a first direction in which the liquid ejecting head is lifted/lowered; a frame that supports the lifting lowering mechanism; and an adjusting member that moves the lifting lowering mechanism relative to the frame in a second direction different from the first direction.

A control method of the head lifting lowering device, the lifting lowering mechanism including a movable rail configured to move relative to the frame and a fixed rail fixed to the frame, includes: a first moving step of causing the liquid ejecting head to move along the fixed rail; and a second moving step of causing the liquid ejecting head to move along the movable rail successively after the first moving step.

A non-transitory computer-readable storage medium storing a program that causes a computer to execute the control method of the head lifting lowering device is provided.

A manufacturing method of the head lifting lowering device includes: an adjusting step of moving the lifting lowering mechanism relative to the frame in the second direction; and an attaching step of attaching the liquid ejecting head to the lifting lowering mechanism after the adjusting step.

BRIEF DESCRIPTION OF THE DRAWINGS

FIG. 8 is a schematic sectional view of the first movable rail positioned at a first rail-adjusting position.

FIG. 9 is a schematic sectional view of the first movable rail positioned at a second rail-adjusting position.

FIG. 10 is a schematic sectional view of a first shaft positioned at a first shaft-adjusting position.

FIG. 11 is a schematic sectional view of the first shaft positioned at a second shaft-adjusting position.

FIG. 12 is a schematic view of the head lifting lowering device that caps the liquid ejecting head.

FIG. 13 is a schematic view of the head lifting lowering device that positions the liquid ejecting head at a separating position.

FIG. 14 is a schematic view of the head lifting lowering device that positions the liquid ejecting head at a wiping position.

DESCRIPTION OF EXEMPLARY EMBODIMENTS

Figure 1:
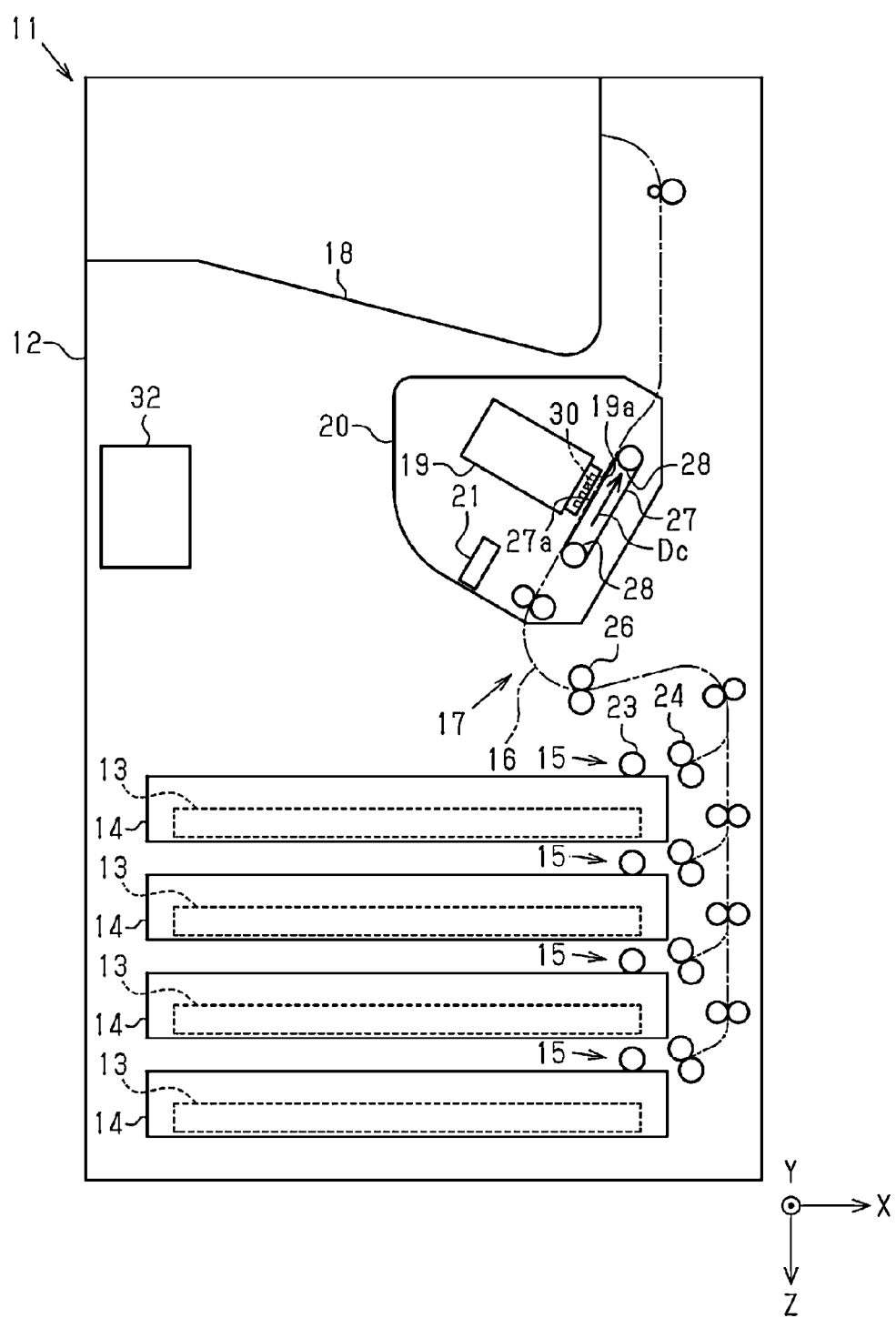
FIG. 1 is a schematic view of an embodiment of a liquid ejecting apparatus.

Hereinafter, an embodiment of a head lifting lowering device, a control method of the head lifting lowering device, a non-transitory computer-readable storage medium storing a program, and a manufacturing method of the head lifting lowering device will be described with reference to the drawings. The head lifting lowering device of the present embodiment is provided in a liquid ejecting apparatus. Examples of the liquid ejecting apparatus include an ink jet printer that ejects ink, which is an example of liquid, onto a medium such as a sheet to perform printing.

In the drawings, on the assumption that a liquid ejecting apparatus 11 is installed on a horizontal surface, the direction of gravity is indicated by the Z-axis, and directions extending horizontally are indicated by the X-axis and the Y-axis. The X-axis, the Y-axis, and the Z-axis are orthogonal to each other. In the following description, a direction parallel to the Y-axis is also referred to as a depth direction Y, a direction parallel to the Z-axis is also referred to as a vertical direction Z.

As illustrated in FIG. 1, the liquid ejecting apparatus 11 may include a housing 12, a medium accommodating section 14 that is able to accommodate a medium 13, and a feeding section 15 that feeds the medium 13. The liquid ejecting apparatus 11 may include a transporting section 17 that transports the medium 13 on a transporting path 16 indicated by the one-dot chain line in the figure and a stacker 18 that receives the medium 13. The transporting path 16 couples the medium accommodating section 14 and the stacker 18.

The liquid ejecting apparatus 11 includes a liquid ejecting head 19 that ejects liquid and a head lifting lowering device 20 that moves the liquid ejecting head 19. The head lifting lowering device 20 may include a cap 21 that covers a nozzle surface 19a of the liquid ejecting head 19.

The medium accommodating section 14 is able to accommodate a plurality of media 13 in a stacked manner. The liquid ejecting apparatus 11 may include a plurality of medium accommodating sections 14 and feeding sections 15 in the same number as the medium accommodating sections 14. The feeding section 15 may include a feeding roller 23 that feeds the medium 13 accommodated in the medium accommodating section 14 and a separating section 24 that separates the media 13 one by one. The feeding section 15 transports the medium 13 accommodated in the medium accommodating section 14 to the transporting path 16.

The transporting section 17 may include a transporting roller 26, an endless transporting belt 27, and a pair of pulleys 28 around which the transporting belt 27 is wound. The transporting section 17 may include a plurality of transporting rollers 26. The transporting rollers 26 transport the medium 13 by rotating in a state in which the transporting rollers 26 hold the medium 13 therebetween.

The transporting belt 27 has a transporting surface 27a on which the medium 13 is transported. The transporting surface 27a is a planar surface of the outer peripheral surface of the transporting belt 27, which supports the medium 13 through, for example, electrostatic adsorption. The transporting belt 27 may be provided such that the transporting surface 27a is inclined with respect to the horizontal. In the present embodiment, a direction which extends along the transporting surface 27a and in which the medium 13 is transported is a transporting direction Dc. The transporting belt 27 circulates around the pulleys 28 and transports, in the transporting direction Dc, the medium 13 supported on the transporting surface 27a.

The liquid ejecting head 19 has the nozzle surface 19a on which a nozzle 30 which ejects liquid is open. The nozzle surface 19a is constituted by a nozzle plate in which the nozzle 30 is open. The liquid ejecting head 19 ejects liquid from the nozzle 30 and performs printing on the medium 13 supported by the transporting belt 27. The liquid ejecting head 19 of the present embodiment is of a line type that is able to eject liquid in the width direction of the medium 13. The liquid ejecting head 19 is attached to the head lifting lowering device 20 such that the longitudinal direction of the liquid ejecting head 19 extends in the depth direction Y.

The liquid ejecting apparatus 11 includes a control section 32 that controls various operations of the liquid ejecting apparatus 11. The control section 32 is constituted by, for example, a computer and a processing circuit including memory and controls the liquid ejecting head 19, the head lifting lowering device 20, the feeding section 15, the transporting section 17, and the like in accordance with a program stored in the memory.

Figure 2:
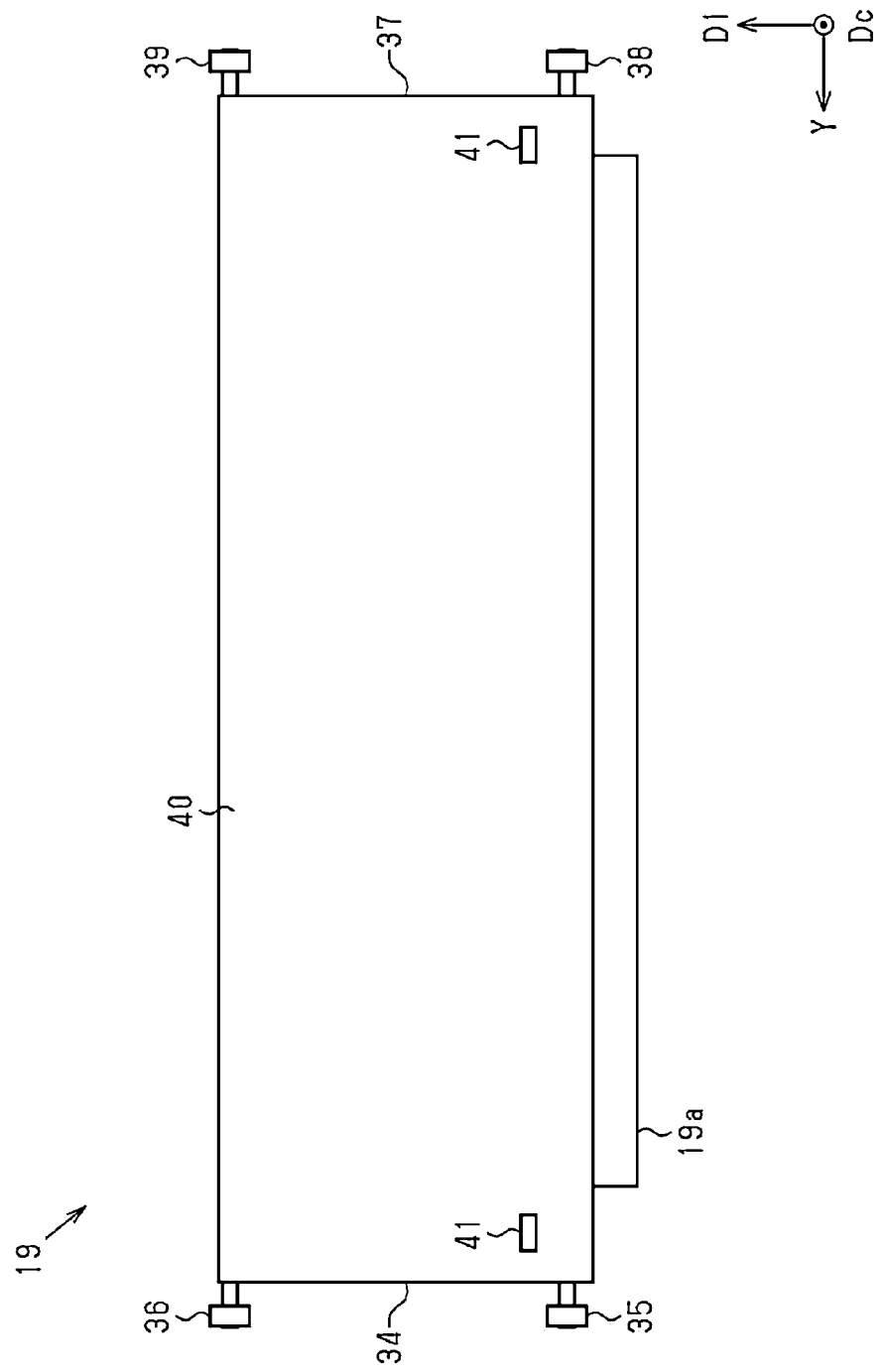
FIG. 2 is a schematic view of a liquid ejecting head.

As illustrated in FIG. 2, the liquid ejecting head 19 may have a first front protrusion 35 and a second front protrusion 36 which protrude forward from a front surface 34 in the depth direction Y and a first rear protrusion 38 and a second rear protrusion 39 which protrude backward from a rear surface 37 in the depth direction Y. The first front protrusion 35, the second front protrusion 36, the first rear protrusion 38, and the second rear protrusion 39 are examples of a protrusion provided on the liquid ejecting head 19. That is, the liquid ejecting head 19 of the present embodiment may be provided with four protrusions. The first front protrusion 35, the second front protrusion 36, the first rear protrusion 38, and the second rear protrusion 39 may have a rotatable roller or runner or a bearing.

The first front protrusion 35 and the second front protrusion 36 are arranged apart from each other in a first direction D1. The first direction D1 of the present embodiment includes a component of a direction perpendicular to the nozzle plate and is a direction perpendicular to the transporting surface 27a. Moreover, the first direction D1 includes a component of the vertical direction and a component of a horizontal direction. The first rear protrusion 38 and the second rear protrusion 39 are arranged apart from each other in the first direction D1. The liquid ejecting head 19 may have a side protrusion 41 that protrudes from a side surface 40 in the transporting direction Dc. The liquid ejecting head 19 may have a plurality of side protrusions 41 arranged in the depth direction Y.

Figure 3:
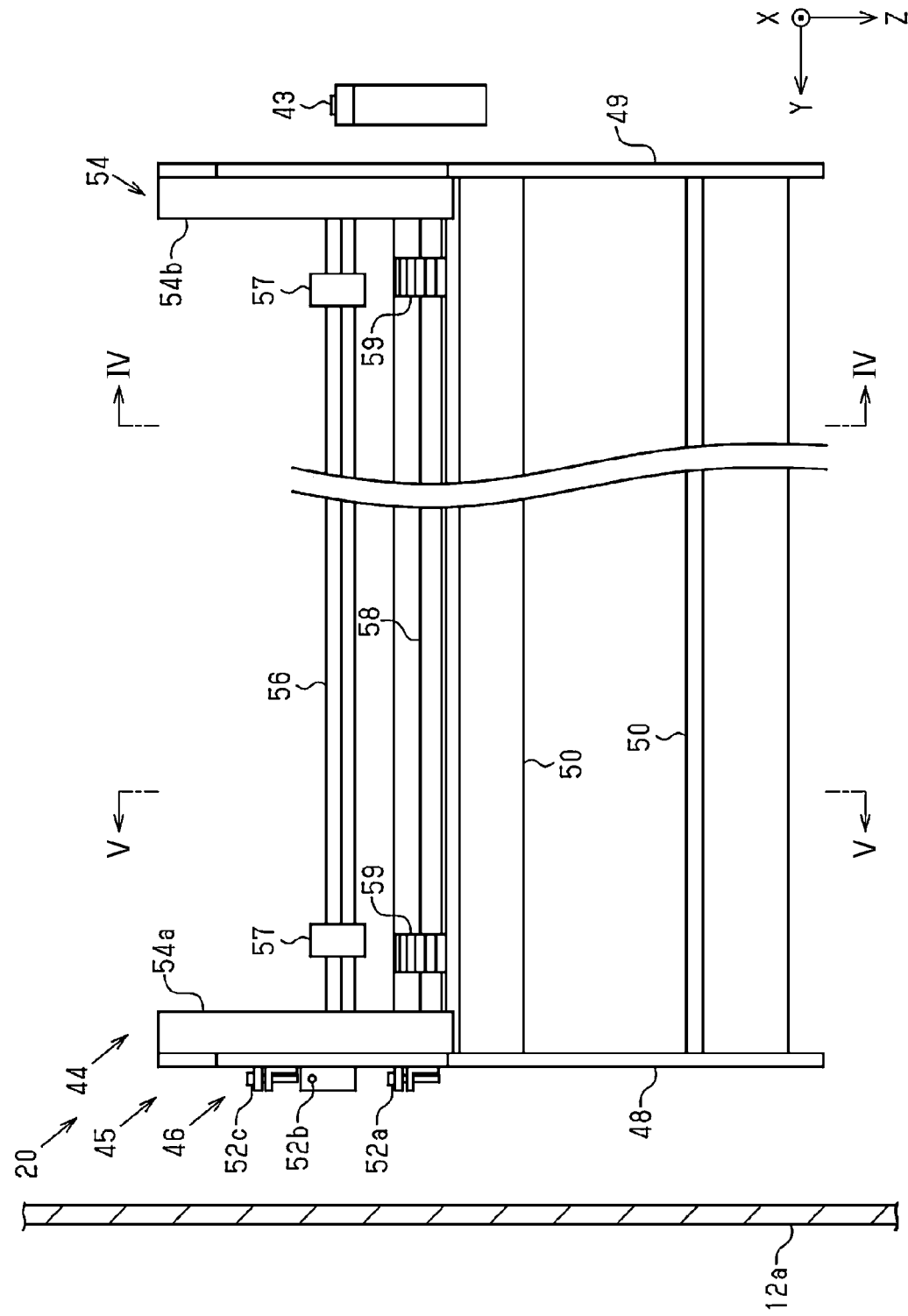
FIG. 3 is a schematic view of a head lifting lowering device.

As illustrated in FIG. 3, the head lifting lowering device 20 may include a wiper 43 for wiping the nozzle surface 19a of the liquid ejecting head 19. The head lifting lowering device 20 includes a lifting lowering mechanism 44 that moves the liquid ejecting head 19 in the first direction D1, a frame 45 that supports the lifting lowering mechanism 44, and an adjusting member 46 that moves the lifting lowering mechanism 44 relative to the frame 45. The first direction D1 is a direction in which the liquid ejecting head 19 is lifted/lowered.

The frame 45 may have a front wall 48, a rear wall 49, and a beam 50 that couples the front wall 48 and the rear wall 49. The front wall 48 and the rear wall 49 are each a wall parallel to the X-axis and the Z-axis and are arranged apart from each other in the depth direction Y. When having a plurality of beams 50, the frame 45 is able to reduce torsion of the front wall 48 and the rear wall 49. The frame 45 accommodates the liquid ejecting head 19 in the interior of the frame 45, which is between the rear wall 49 and the front wall 48 in the depth direction Y. The lifting lowering mechanism 44 may be provided inside the frame 45.

The adjusting member 46 may include a first screw 52a to a third screw 52c which are provided outside the frame 45 in the depth direction Y. The lifting lowering mechanism 44 may move relative to the frame 45 upon rotation of the first screw 52a to the third screw 52c. The adjusting member 46 of the present embodiment is provided on the front wall 48. Moreover, the adjusting member 46 is provided on the depth direction Y side of a front cover 12a of the housing 12. The closed front cover 12a may cover the first screw 52a to the third screw 52c, and opening the front cover 12a may expose the first screw 52a to the third screw 52c.

The lifting lowering mechanism 44 may have a rail 54 supported by the frame 45. The rail 54 of the present embodiment is constituted by a front rail 54a provided on the front wall 48 and a rear rail 54b provided on the rear wall 49.

The lifting lowering mechanism 44 may have a first shaft 56 supported by the front wall 48 and the rear wall 49 and a cam 57 fixed to the first shaft 56. The lifting lowering mechanism 44 may have a second shaft 58 supported by the front wall 48 and the rear wall 49 and a driving gear 59 fixed to the second shaft 58. The lifting lowering mechanism 44 may have a plurality of cams 57 and a plurality of driving gears 59.

Figure 4:
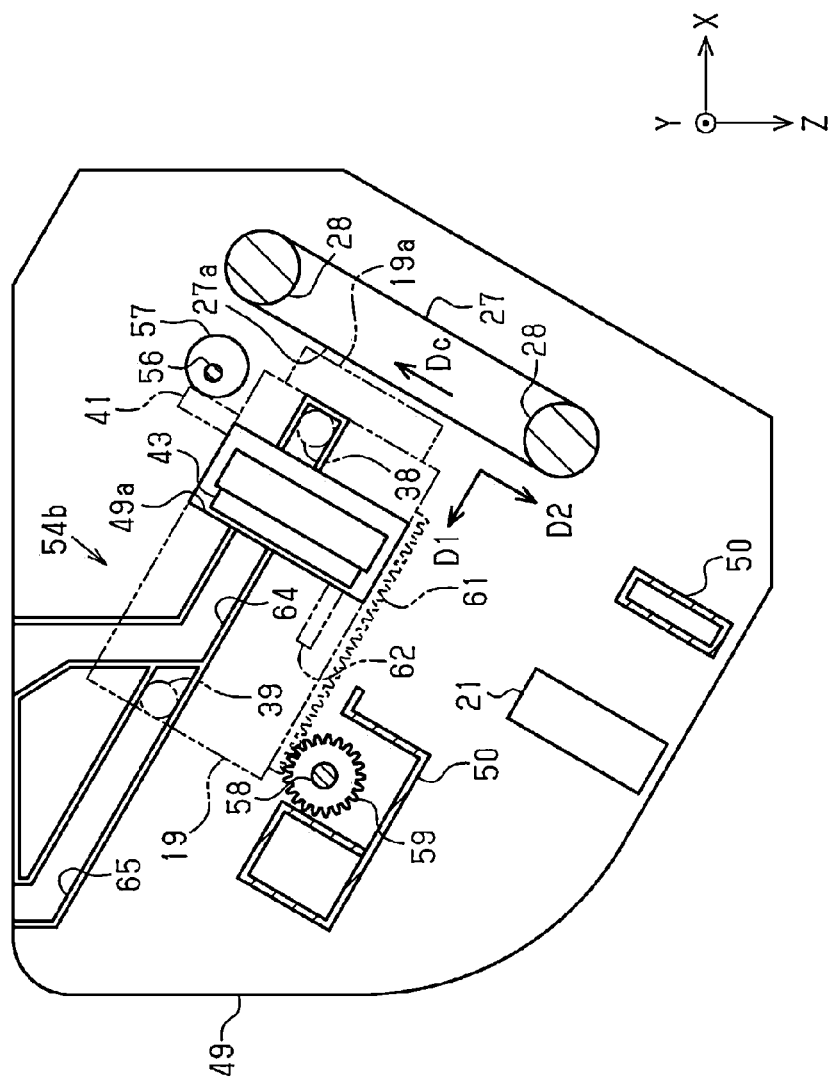
FIG. 4 is a sectional view taken along line IV-IV in FIG. 3.

As illustrated in FIG. 4, a through hole 49a that enables the wiper 43 to move may be formed in the rear wall 49. The liquid ejecting apparatus 11 may include a wiper moving mechanism (not illustrated) that reciprocates the wiper 43 along the Y-axis. As illustrated in FIG. 3, a standby position of the wiper 43 is located outside the frame 45 and on the rear side of the rear wall 49 in the depth direction Y. The wiper 43 moves from the standby position illustrated in FIG. 3 in the depth direction Y, passes through the through hole 49a, advances into the frame 45, and wipes the nozzle surface 19a.

The cap 21 is provided on an inner side of the frame 45 in the depth direction Y. The cap 21 has a retreat position illustrated in FIG. 4 and a capping position illustrated in FIG. 12. The liquid ejecting apparatus 11 may include a cap moving mechanism (not illustrated) that moves the cap 21 between the retreat position and the capping position.

The lifting lowering mechanism 44 may have a rack 61 engaging the driving gear 59 and a spring 62 provided between the rack 61 and the liquid ejecting head 19. The rack 61 moves relative to the driving gear 59 in the first direction D1 in accordance with rotation of the driving gear 59. The liquid ejecting head 19 moves together with the rack 61. The first direction D1 is a direction in which the liquid ejecting head 19 moves away from the transporting surface 27a, and the first direction D1 of the present embodiment is perpendicular to the transporting surface 27a. Specifically, the rack 61 and the liquid ejecting head 19 move in the first direction D1 upon normal rotation of the driving gear 59 and move in the direction opposite to the first direction D1 and approach the transporting surface 27a upon reverse rotation of the driving gear 59.

The rear rail 54b has a first rear guiding section 64 and a second rear guiding section 65. The first rear guiding section 64 guides the first rear protrusion 38 in the first direction D1. The second rear guiding section 65 guides the second rear protrusion 39 in the first direction D1.

Figure 5:
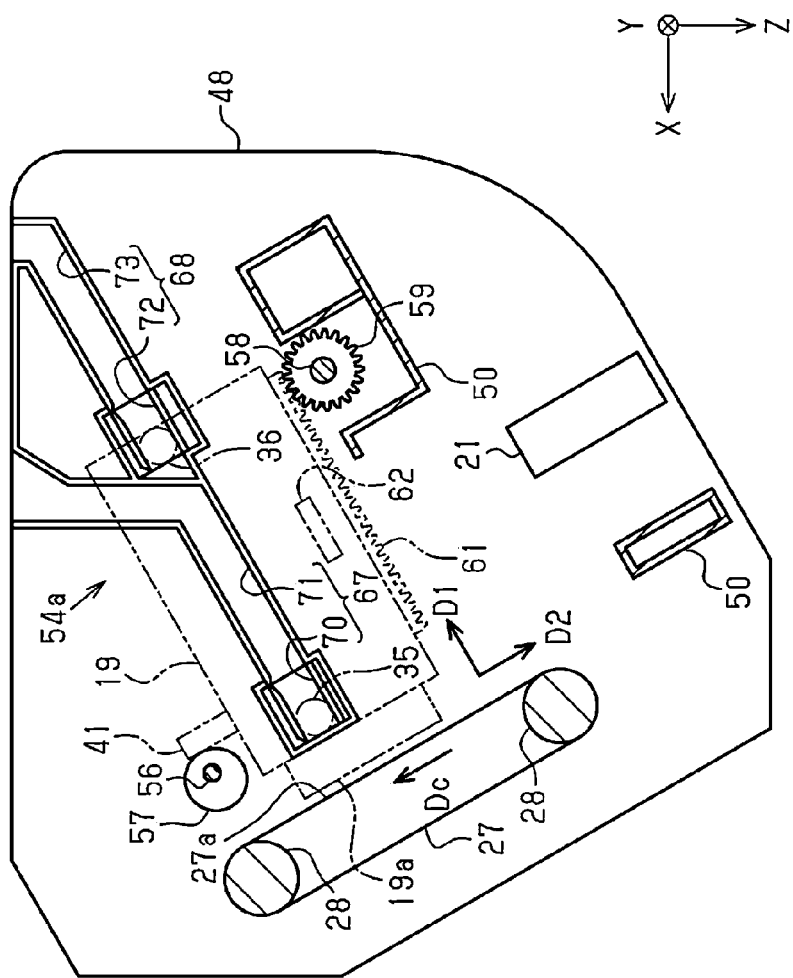
FIG. 5 is a sectional view taken along line V-V in FIG. 3.

As illustrated in FIG. 5, the front rail 54a has a first front guiding section 67 and a second front guiding section 68. The first front guiding section 67 guides the first front protrusion 35 in the first direction D1. The second front guiding section 68 guides the second front protrusion 36 in the first direction D1. In other words, the first direction D1 is a direction in which the liquid ejecting head 19 is guided by the rail 54 and a direction in which the rail 54 extends.

The first front guiding section 67 may have a first movable rail 70, which is an example of a movable rail, and a first fixed rail 71, which is an example of a fixed rail. The second front guiding section 68 may have a second movable rail 72, which is an example of a movable rail, and a second fixed rail 73, which is an example of a fixed rail. The first fixed rail 71 and the second fixed rail 73 are fixed to the frame 45. The adjusting member 46 moves the first movable rail 70 and the second movable rail 72 relative to the frame 45. The adjusting member 46 of the present embodiment is able to move each of the first movable rail 70 and the second movable rail 72 independently.

Upon reverse rotation of the driving gear 59, the liquid ejecting head 19 moves along the rail 54 so as to approach the transporting surface 27a, and the movement is regulated when the side protrusion 41 comes into contact with the cam 57. The liquid ejecting head 19 may eject liquid onto the transported medium 13 to perform printing in a state in which the first front protrusion 35 is held at a first position that is located inside the first movable rail 70 and that is illustrated in FIG. 5 and in which the second front protrusion 36 is held at a first position that is located inside the second movable rail 72 and that is illustrated in FIG. 5.

The position of the liquid ejecting head 19 in the first direction D1 is adjusted in accordance with rotation of the cam 57. That is, when the cam 57 rotates in the state illustrated in FIG. 5, in which each of the first front protrusion 35 and the second front protrusion 36 is positioned at the first position, the liquid ejecting head 19 is pushed by the cam 57 and moves in the first direction D1. Specifically, the liquid ejecting head 19 moves between a first printing position illustrated in FIG. 5 and a second printing position illustrated in FIG. 6. In accordance with movement of the liquid ejecting head 19, a distance between the nozzle surface 19a and the transporting surface 27a is adjusted. The spring 62 enables the liquid ejecting head 19 to move. Thus, the cam 57 rotates in a state in which the driving gear 59 is stopped, and the rack 61 does not move. Note that the position of the liquid ejecting head 19 in the first direction D1 in a state in which the side protrusion 41 is in contact with the cam 57 may be adjusted by rotating the cam 57 when the side protrusion 41 is not in contact with the cam 57.

Figure 6:
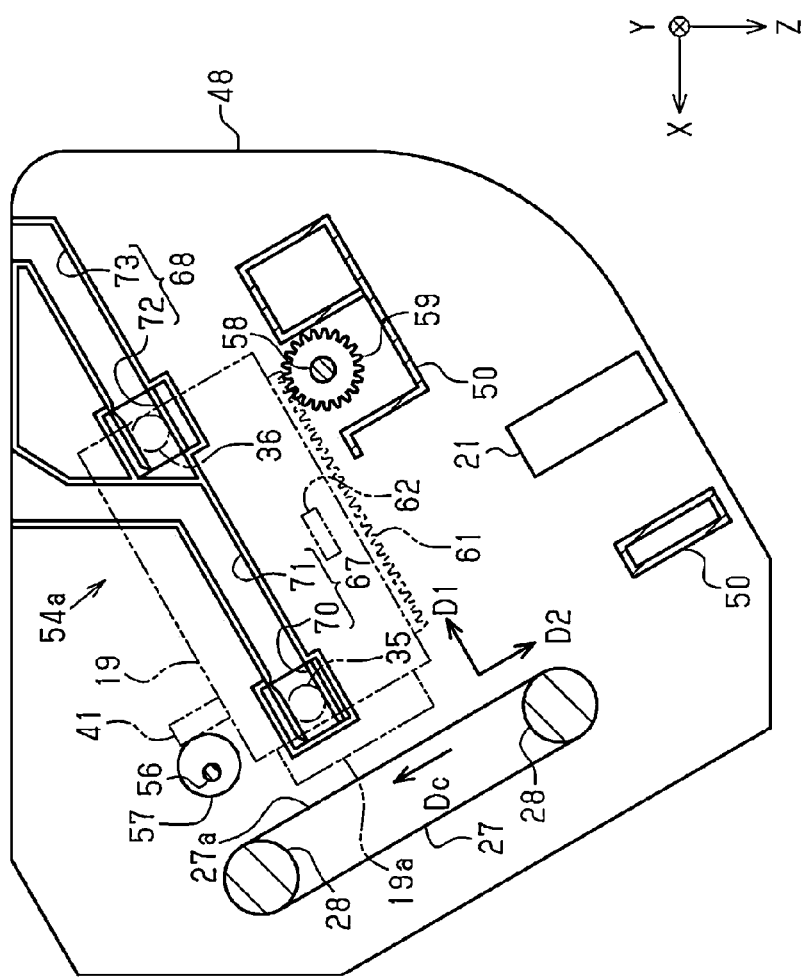
FIG. 6 is a schematic view of the head lifting lowering device that positions the liquid ejecting head at a second printing position.

As illustrated in FIG. 6, the liquid ejecting head 19 may eject liquid onto the transported medium 13 to perform printing in a state in which the first front protrusion 35 is held at a second position that is located inside the first movable rail 70 and that is illustrated in FIG. 6 and in which the second front protrusion 36 is held at a second position that is located inside the second movable rail 72 and that is illustrated in FIG. 6. The nozzle surface 19a of the liquid ejecting head 19 in which the first front protrusion 35 and the second front protrusion 36 are each held at the first position may be parallel to the nozzle surface 19a of the liquid ejecting head 19 in which the first front protrusion 35 and the second front protrusion 36 are each held at the second position.

In the present embodiment, the first movable rail 70 and the second movable rail 72 have the same configuration, and a coupling portion of the first movable rail 70 and the first fixed rail 71 and a coupling portion of the second movable rail 72 and the second fixed rail 73 also have the same configuration. Thus, in the following description, the first movable rail 70 and the first fixed rail 71 will be described, and a common component will be given the same reference numeral to thereby omit redundant description.

Figure 7:
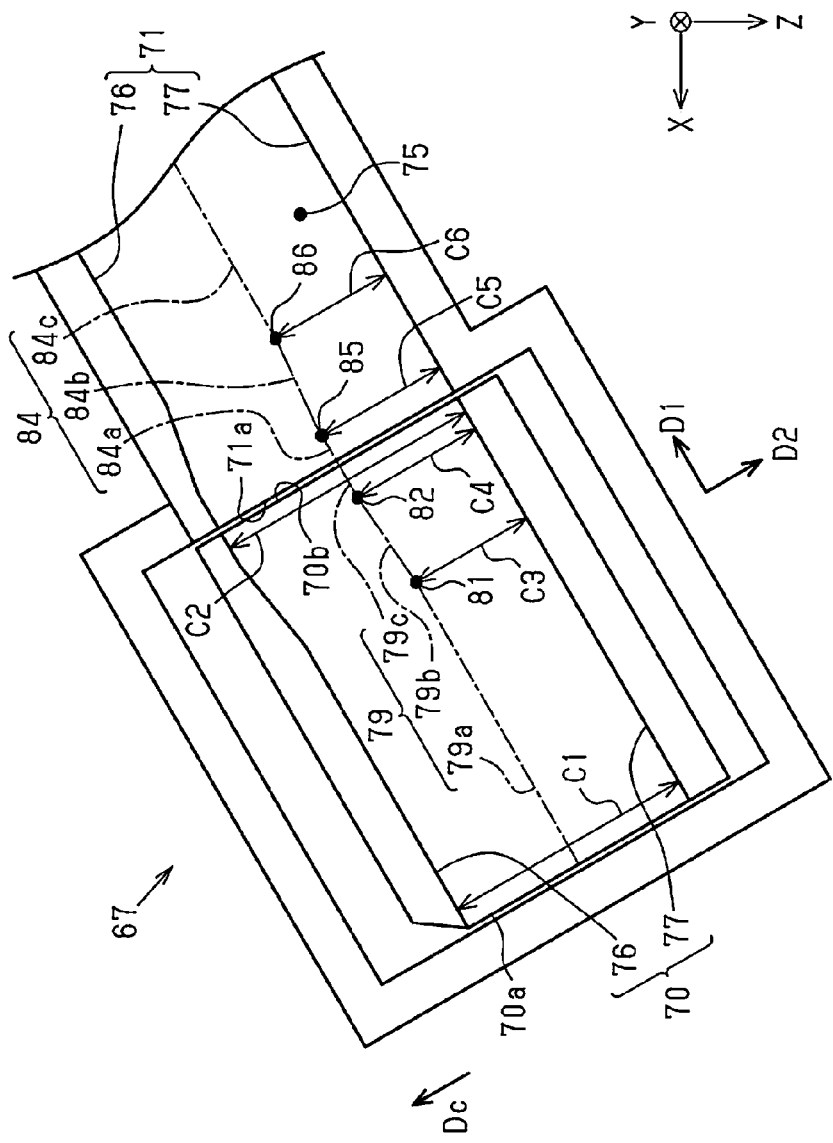
FIG. 7 is a schematic view of a first movable rail and a first fixed rail.

As illustrated in FIG. 7, the first movable rail 70 and the first fixed rail 71 may have an upper wall 76 and a lower wall 77 that form a moving path 75 on which the first front protrusion 35 moves. In the first movable rail 70, compared with a first gap C1 between the upper wall 76 and the lower wall 77 in a first end 70a of the moving path 75, a second gap C2 between the upper wall 76 and the lower wall 77 in a second end 70b opposite to the first end 70a may be great. The second end 70b is adjacent to the first fixed rail 71.

A first virtual line 79, which extends from the first end 70a of the first movable rail 70 to the second end 70b so as to pass through the center between the upper wall 76 and the lower wall 77 in a second direction D2, which is indicated by the one-dot chain line in FIG. 7, and which is an example of a virtual line, includes a first segment 79a, a second segment 79b, and a third segment 79c. The first segment 79a is parallel to the lower wall 77 and couples the first end 70a and a first end point 81. The second segment 79b couples the first end point 81 and a second end point 82. The third segment 79c is parallel to the lower wall 77 and couples the second end point 82 and the second end 70b.

In the second direction D2, a third gap C3 between the first end point 81 and the lower wall 77 is half the first gap C1. In the second direction D2, a fourth gap C4 between the second end point 82 and the lower wall 77 is half the second gap C2. The fourth gap C4 is greater than the third gap C3.

A third end 71a of the first fixed rail 71 is adjacent to the first movable rail 70. A second virtual line 84, which passes through the center between the upper wall 76 and the lower wall 77 in the second direction D2, includes a fourth segment 84a, a fifth segment 84b, and a sixth segment 84c. The fourth segment 84a is parallel to the lower wall 77 and couples the third end 71a and a third end point 85. The fifth segment 84b couples the third end point 85 and a fourth end point 86. The sixth segment 84c passes through the fourth end point 86 and is parallel to the lower wall 77. In the second direction D2, a fifth gap C5 between the third end point 85 and the lower wall 77 is greater than a sixth gap C6 between the fourth end point 86 and the lower wall 77.

As illustrated in FIG. 6, the adjusting member 46 moves the first movable rail 70 and the second movable rail 72 relative to the frame 45 in the second direction D2 different from the first direction D1. Upon movement of the first movable rail 70 and the second movable rail 72, the rack 61 also moves in the second direction D2 together with the liquid ejecting head 19. That is, the adjusting member 46 may change the position of the rack 61 relative to the driving gear 59 in the second direction D2. The teeth of the rack 61 of the present embodiment face the second direction D2. The maximum change amount by which the adjusting member 46 changes the position of the rack 61 may be smaller than the maximum height of the teeth of the rack 61. The second direction D2 of the present embodiment is a direction opposite to the transporting direction Dc.

As illustrated in FIGS. 8 and 9, the front wall 48 may have a first supporting section 48a that rotatably supports the first screw 52a. The adjusting member 46 may have a first moving section 89 in which a first threaded hole 88 into which the first screw 52a is screwed is formed. When the first screw 52a rotates, the first moving section 89 moves relative to the first supporting section 48a. The moving amount of the first moving section 89 is determined in accordance with the rotation amount of the first screw 52a. Moreover, the first moving section 89 may be urged by a spring (not illustrated) such that a distance to the first supporting section 48a becomes long or short, and the first screw 52a may move the first moving section 89 against a spring force of the spring. Further, movement of the first moving section 89 in the first direction D1 may be regulated by a protrusion provided on the front wall 48.

The first movable rail 70 is fixed to the first moving section 89. When the first screw 52a rotates counterclockwise, the first movable rail 70 and the first moving section 89 move in the second direction D2. When the first screw 52a rotates clockwise, the first movable rail 70 and the first moving section 89 move in a direction opposite to the second direction D2. Specifically, the first movable rail 70 and the first moving section 89 are able to move between a first rail-adjusting position illustrated in FIG. 8 and a second rail-adjusting position illustrated in FIG. 9. Similarly, when the third screw 52c rotates, the second movable rail 72 moves in the second direction D2 or the direction opposite to the second direction D2.

As illustrated in FIGS. 10 and 11, the front wall 48 may have a second supporting section 48b that supports the second screw 52b. The adjusting member 46 may have a second moving section 91 in which a second threaded hole 90 into which the second screw 52b is screwed is formed. When the second screw 52b rotates, the second moving section 91 moves relative to the second supporting section 48b. The moving amount of the second moving section 91 is determined in accordance with the rotation amount of the second screw 52b.

The front end of the first shaft 56 is fixed to the second moving section 91. When the second screw 52b rotates clockwise, the front end of the first shaft 56 and the second moving section 91 move in the first direction D1. When the second screw 52b rotates counterclockwise, the front end of the first shaft 56 and the second moving section 91 move in the direction opposite to the first direction D1. Specifically, the front end of the first shaft 56 and the second moving section 91 are able to move between a first shaft-adjusting position illustrated in FIG. 10 and a second shaft-adjusting position illustrated in FIG. 11.

An action of the present embodiment will be described.

A manufacturing method of the head lifting lowering device 20 includes an adjusting step of moving the lifting lowering mechanism 44 relative to the frame 45 in the second direction D2 and an attaching step of attaching the liquid ejecting head 19 to the lifting lowering mechanism 44 after the adjusting step. In the adjusting step, a longitudinal-direction adjusting step, a height adjusting step, and an inclination adjusting step may be sequentially performed.

In the adjusting step, not the liquid ejecting head 19 but a temporary head (not illustrated) may be attached to the frame 45. The temporary head is not configured to eject liquid from the nozzle 30 but has the same external shape as that of the liquid ejecting head 19. Therefore, the configuration of the temporary head will be described by assigning the same reference numeral as that of the liquid ejecting head 19. That is, the temporary head has the first front protrusion 35, the second front protrusion 36, the first rear protrusion 38, the second rear protrusion 39, and the side protrusion 41 which are the same as those of the liquid ejecting head 19 in size and arrangement. When the temporary head is attached to the head lifting lowering device 20, the first front protrusion 35, the second front protrusion 36, the first rear protrusion 38, the second rear protrusion 39, and the side protrusion 41 are held by the first front guiding section 67, the second front guiding section 68, the first rear guiding section 64, the second rear guiding section 65, and the cam 57, respectively.

In the longitudinal-direction adjusting step, the adjusting member 46 moves the first movable rail 70 relative to the first rear guiding section 64. Specifically, an operator rotates the first screw 52a, which is an example of a screw, to move the first movable rail 70 in the second direction D2 or the direction opposite to the second direction D2 and thereby performs adjustment such that the longitudinal direction of the temporary head is parallel to the Y-axis when viewed in the first direction D1.

In the longitudinal-direction adjusting step, the first rear guiding section 64 functions as a reference member that supports the liquid ejecting head 19, and the first movable rail 70 functions as a movable member that supports the liquid ejecting head 19 and is movable relative to the frame 45. The first rear guiding section 64 and the first movable rail 70 are provided apart from each other in the longitudinal direction of the liquid ejecting head 19, that is, the depth direction Y.

In the height adjusting step, the front end of the first shaft 56, which is supported by the front wall 48, is moved with the rear end of the first shaft 56, which is supported by the rear wall 49, as a reference. Specifically, the operator rotates the second screw 52b to move the front end of the first shaft 56 in the first direction D1 or the direction opposite to the first direction D1 and thereby performs adjustment such that a distance between the transporting surface 27a and the nozzle surface 19a is constant through the longitudinal direction of the temporary head.

In the inclination adjusting step, the adjusting member 46 moves the second movable rail 72 relative to the first movable rail 70. Specifically, the operator rotates the third screw 52c, which is an example of a screw, to move the second movable rail 72 in the second direction D2 or the direction opposite to the second direction D2 and performs adjustment such that the first front protrusion 35 and the second front protrusion 36 are arranged side by side in the first direction D1.

In the inclination adjusting step, the first movable rail 70 functions as a reference member that supports the liquid ejecting head 19, and the second movable rail 72 functions as a movable member that is able to move relative to the frame 45. The first movable rail 70 and the second movable rail 72 are provided apart from each other in the first direction D1.

After finishing the adjusting step, the operator performs the attaching step of replacing the temporary head with the liquid ejecting head 19. That is, the operator removes the temporary head from the lifting lowering mechanism 44 and attaches the liquid ejecting head 19 to the lifting lowering mechanism 44 while retaining the first movable rail 70, the second movable rail 72, and the first shaft 56 at the adjusted positions.

Next, switching between a printing time and a non-printing time will be described.

As illustrated in FIG. 12, at the non-printing time during which no printing is performed, the liquid ejecting head 19 is positioned at a standby position illustrated in FIG. 12 and is capped with the cap 21 positioned at the capping position. In a state in which the liquid ejecting head 19 is positioned at the standby position, the first front protrusion 35 is held by the first fixed rail 71, and the second front protrusion 36 is held by the second fixed rail 73. That is, the cap 21 covers the nozzle surface 19a of the liquid ejecting head 19 in the state in which the first front protrusion 35 is held by the first fixed rail 71 and in which the second front protrusion 36 is held by the second fixed rail 73.

As illustrated in FIG. 13, when printing is performed, the control section 32 causes the driving gear 59 to normally rotate and causes the liquid ejecting head 19 to move in the first direction D1. The liquid ejecting head 19 moves from the standby position to a separating position illustrated in FIG. 13 and separates from the cap 21. The liquid ejecting head 19 positioned at the separating position has the first front protrusion 35 held by the first fixed rail 71 and has the second front protrusion 36 held by the second fixed rail 73.

Next, as illustrated in FIG. 5, the control section 32 causes the cap 21 to move to the retreat position. The control section 32 causes the driving gear 59 to reversely rotate and causes the liquid ejecting head 19 to move in the direction opposite to the first direction D1. The liquid ejecting head 19 moves from the separating position so as to approach the transporting surface 27a and stops at a position at which the side protrusion 41 comes into contact with the cam 57. In the state in which the side protrusion 41 is in contact with the cam 57, the first front protrusion 35 is held by the first movable rail 70, and the second front protrusion 36 is held by the second movable rail 72. That is, the control section 32 successively causes the liquid ejecting head 19 to move along the first fixed rail 71 and the second fixed rail 73 and to move along the first movable rail 70 and the second movable rail 72. Thus, the control method of the head lifting lowering device 20 includes a first moving step of causing the liquid ejecting head 19 to move along the first fixed rail 71 and the second fixed rail 73 and a second moving step of causing the liquid ejecting head 19 to move along the first movable rail 70 and the second movable rail 72 successively after the first moving step.

As illustrated in FIG. 13, when printing ends, the control section 32 causes the driving gear 59 to normally rotate and causes the liquid ejecting head 19 to move from the printing position to the separating position. At this time, the control section 32 causes the liquid ejecting head 19 to move along the first movable rail 70 and the second movable rail 72 and then move along the first fixed rail 71 and the second fixed rail 73.

As illustrated in FIG. 12, the control section 32 then causes the cap 21 to move to the capping position in the state in which the liquid ejecting head 19 is positioned at the separating position. The control section 32 causes, in the state in which the cap 21 is positioned at the capping position, the liquid ejecting head 19 to move to the standby position and to be capped with the cap 21.

Next an instance in which wiping is performed will be described.

As illustrated in FIG. 14, the control section 32 causes the driving gear 59 to rotate and causes the liquid ejecting head 19 to be positioned at a wiping position. The wiping position is a position between the printing position and the standby position in the first direction D1. When the liquid ejecting head 19 is positioned at the wiping position, the first front protrusion 35 is positioned in the first fixed rail 71, and the second front protrusion 36 is positioned in the second fixed rail 73. The control section 32 causes the wiper 43 to move in the depth direction Y to wipe the nozzle surface 19a with the wiper 43. Thus, the wiper 43 wipes the nozzle surface 19a of the liquid ejecting head 19 in the state in which the first front protrusion 35 is held by the first fixed rail 71 and in which the second front protrusion 36 is held by the second fixed rail 73.

Effects of the present embodiment will be described.

The lifting lowering mechanism 44 moves the liquid ejecting head 19 in the first direction D1 in which the liquid ejecting head 19 is lifted/lowered. The adjusting member 46 moves the lifting lowering mechanism 44 in the second direction D2. That is, the adjusting member 46 moves the liquid ejecting head 19 in the second direction D2 via the lifting lowering mechanism 44. Accordingly, it is possible to adjust the position of the liquid ejecting head 19 in the first direction D1 by the lifting lowering mechanism 44 and adjust the position of the liquid ejecting head 19 in the second direction D2 by the adjusting member 46, thus making it possible to easily adjust the position of the liquid ejecting head 19 in plural directions.

The rail 54 that guides the first front protrusion 35, the second front protrusion 36, the first rear protrusion 38, and the second rear protrusion 39 which are provided in the liquid ejecting head 19 is supported by the frame 45. Accordingly, it is possible to increase the dimension of the rail 54 compared with, for example, an instance in which the rail 54 is provided in the liquid ejecting head 19 and in which a protrusion is provided in the frame 45. A distance by which the liquid ejecting head 19 is able to move is determined in accordance with the dimension of the rail 54. Thus, it is possible to increase the moving distance of the liquid ejecting head 19.

The adjusting member 46 moves the first movable rail 70 and the second movable rail 72 relative to the frame 45. Thus, it is possible to easily adjust the position of the liquid ejecting head 19 compared with an instance in which the adjusting member 46 moves the entire rail 54. For example, holding the liquid ejecting head 19 by the first movable rail 70 and the second movable rail 72 at the time of printing and holding the liquid ejecting head 19 by the first fixed rail 71 and the second fixed rail 73 at the time of capping or wiping facilitates adjustment performed by the adjusting member 46 and enables printing to be performed on the medium 13 with high quality.

In the first movable rail 70, the second gap C2 in the second end 70b adjacent to the first fixed rail 71 is greater than the first gap C1 in the first end 70a. Accordingly, it is possible to smoothly move the first front protrusion 35 between the first movable rail 70 and the first fixed rail 71.

The first direction D1 includes a component of the horizontal direction. The protrusion of the liquid ejecting head 19 thus readily moves along the lower wall 77 of the upper wall 76 and the lower wall 77. The first segment 79a and the third segment 79c are parallel to the lower wall 77, and the fourth gap C4 between the second end point 82 and the lower wall 77 is greater than the third gap C3 between the first end point 81 and the lower wall 77. Accordingly, the lower wall 77 is able to be formed so as to be smoother than the upper wall 76, enabling a reduction in vibration of the liquid ejecting head 19 moving along the lower wall 77.

The liquid ejecting head 19 is able to eject liquid onto the medium 13 at plural positions in the first movable rail 70. Accordingly, the result of adjustment performed by the adjusting member 46 is able to be used in a plurality of printing modes.

By ejecting liquid in a state in which the nozzle surface 19a is parallel to the medium 13, the liquid ejecting head 19 is able to perform printing on the medium 13 with high quality compared with an instance in which the liquid ejecting head 19 ejects liquid in a state in which the nozzle surface 19a is not parallel to the medium 13. The nozzle surface 19a is retained to be parallel even when the liquid ejecting head 19 moves along the first movable rail 70. Accordingly, since the result of adjustment performed in the adjusting step is able to be used even when the liquid ejecting head 19 moves along the first movable rail 70, it is possible to suppress a degradation in printing quality even when the liquid ejecting head 19 ejects liquid onto the medium 13 at plural positions.

Since the liquid ejecting head 19 moves along the first movable rail 70 and the first fixed rail 71, it is possible to increase the moving distance of the liquid ejecting head 19 compared with an instance in which the liquid ejecting head 19 moves along only the first movable rail 70. Accordingly, the liquid ejecting head 19 is able to readily leave a position at which the liquid ejecting head 19 ejects liquid onto the medium 13. The cap 21 covers the nozzle surface 19a of the liquid ejecting head 19 in the state in which the first front protrusion 35 and the second front protrusion 36 are held by the first fixed rail 71 and the second fixed rail 73. Accordingly, it is possible to easily ensure a space in which the cap 21 covers the nozzle surface 19a.

The wiper 43 wipes the nozzle surface 19a of the liquid ejecting head 19 in the state in which the first front protrusion 35 and the second front protrusion 36 are held by the first fixed rail 71 and the second fixed rail 73. Accordingly, it is possible to easily ensure a space in which the wiper 43 wipes the nozzle surface 19a.

Since the rack 61 moves in the first direction D1, it is possible to easily move the liquid ejecting head 19 in the first direction D1 by providing the rack 61 in the liquid ejecting head 19. Since the teeth of the rack 61 face the second direction D2, it is possible to reduce possible disengagement between the driving gear 59 and the rack 61 even when the adjusting member 46 changes the position of the rack 61 in the second direction D2.

Since the maximum change amount by which the adjusting member 46 changes the position of the rack 61 is smaller than the maximum height of the teeth of the rack 61, it is possible to reduce possible disengagement between the driving gear 59 and the rack 61.

The adjusting member 46 moves the movable member relative to the reference member. The adjusting member 46 is thus able to adjust the position of the liquid ejecting head 19 by moving the liquid ejecting head 19 in a circumferential direction around the reference member.

The first rear guiding section 64 and the first movable rail 70 are provided apart from each other in the longitudinal direction of the liquid ejecting head 19. The adjusting member 46 is thus able to adjust the inclination of the liquid ejecting head 19 in the longitudinal direction by moving the first movable rail 70 relative to the first rear guiding section 64.

The first movable rail 70 and the second movable rail 72 are provided apart from each other in the first direction D1. The adjusting member 46 is thus able to adjust the inclination of the liquid ejecting head 19 with respect to the first direction D1 by moving the second movable rail 72 relative to the first movable rail 70.

The adjusting member 46 is provided outside the frame 45. Thus, for example, in an instance in which the head lifting lowering device 20 is arranged at a position at which the head lifting lowering device 20 is exposed by opening the front cover 12a provided in the housing 12, it is possible to easily adjust the position of the liquid ejecting head 19 from outside the housing 12 even when the head lifting lowering device 20 is accommodated in the housing 12.

When the first screw 52a to the third screw 52c which are provided outside the frame 45 are rotated, the lifting lowering mechanism 44 moves relative to the frame 45. It is therefore possible to easily adjust the position of the lifting lowering mechanism 44 from outside the frame 45.

The head lifting lowering device 20 performs the second moving step successively after the first moving step. It is thus possible to move the liquid ejecting head 19 by a long distance compared with an instance in which only one of the first moving step and the second moving step is performed.

After the adjusting step is performed to adjust the position of the lifting lowering mechanism 44, the liquid ejecting head 19 is attached to the adjusting member 46. Thus, the lifting lowering mechanism 44 is not necessarily moved, for example, when the liquid ejecting head 19 is replaced, and it is therefore possible to easily replace the liquid ejecting head 19.

The adjusting member 46 and the front cover 12a provided in the housing 12 are arranged in the depth direction Y, and opening the front cover 12a exposes the adjusting member 46. Thus, even after the head lifting lowering device 20 is embedded in the liquid ejecting apparatus 11, it is possible to adjust the position of the liquid ejecting head 19 by operating the adjusting member 46 from the front side of the liquid ejecting apparatus 11.

The present embodiment is able to be modified and implemented in the following manner. The present embodiment and the following modified examples may be implemented in combination within a range in which they do not technically contradict each other.

In the first direction D1, the dimension of the rail 54 may be greater than the dimension of the liquid ejecting head 19.

The liquid ejecting head 19 is thereby able to move in the first direction D1 by a distance longer than the dimension of the liquid ejecting head 19.

The liquid ejecting apparatus 11 may include a driving section that rotates each of the first screw 52a to the third screw 52c. The control section 32 may control drive of the driving section to separately rotate the first screw 52a to the third screw 52c.

The adjusting member 46 may adjust the position of the lifting lowering mechanism 44 by rotating the cam.

The liquid ejecting apparatus 11 may fix the lifting lowering mechanism 44, the position of which has been adjusted by the adjusting member 46, to the frame 45, for example, by using a screw.

The adjusting member 46 may be provided inside the frame 45.

The adjusting member 46 may be provided on the rear wall 49.

The adjusting member 46 may adjust the position of at least one of the first front protrusion 35, the second front protrusion 36, the first rear protrusion 38, and the second rear protrusion 39.

The rack 61 may be fixed to the frame 45, and the driving gear 59 may be fixed to the liquid ejecting head 19.

The maximum change amount by which the adjusting member 46 changes the position of the rack 61 may be equal to or more than the maximum height of the teeth of the rack 61. The adjusting member 46 may adjust the position of the driving gear 59 in accordance with the position of the rack 61.

The teeth of the rack 61 may face a direction different from the second direction D2. For example, an angle of the rack 61 may vary in accordance with the position of the liquid ejecting head 19 in the second direction D2.

The lifting lowering mechanism 44 may move the liquid ejecting head 19 by fixing the liquid ejecting head 19 to an annular belt and causing the belt to circulate. The lifting lowering mechanism 44 may move the liquid ejecting head 19 so as to raise the liquid ejecting head 19, for example, by using a winch. The lifting lowering mechanism 44 may move the liquid ejecting head 19 so as to push the liquid ejecting head 19 up, for example, by using a jack.

The adjusting member 46 may move the entire rail 54 in the second direction D2. That is, the entire rail 54 may be constituted by a movable rail.

The wiper 43 may wipe the nozzle surface 19a of the liquid ejecting head 19 in a state in which the first front protrusion 35 and the second front protrusion 36 are each held by the movable rail.

The cap 21 may cover the nozzle surface 19a of the liquid ejecting head 19 in the state in which the first front protrusion 35 and the second front protrusion 36 are each held by the movable rail.

The nozzle surface 19a of the liquid ejecting head 19 in which the first front protrusion 35 is held at the first position in the first movable rail 70 is not necessarily limited to being parallel to the nozzle surface 19a of the liquid ejecting head 19 in which the first front protrusion 35 is held at the second position in the first movable rail 70.

The fourth gap C4 between the second end point 82 and the lower wall 77 may be equal to or less than the third gap C3 between the first end point 81 and the lower wall 77.

In the first movable rail 70, the first gap C1 between the upper wall 76 and the lower wall 77 in the first end 70a may be equal to or more than the second gap C2 between the upper wall 76 and the lower wall 77 in the second end 70b.

At least a portion of the rail 54 may be curved. At least a portion of the rail 54 may be bent.

The rail 54 may be provided in the liquid ejecting head 19. The first front protrusion 35, the second front protrusion 36, the first rear protrusion 38, and the second rear protrusion 39 may be provided in the frame 45.

The liquid ejecting apparatus 11 may be a liquid ejecting apparatus that ejects or discharges liquid other than ink. The liquid to be ejected as droplets of a minute amount of liquid from the liquid ejecting apparatus may be in, for example, a granular state, a teardrop state, or a tailing thread-like state. Any liquid is applicable here as long as the liquid is able to be ejected from the liquid ejecting apparatus. For example, any liquid is applicable as long as a substance thereof is in a liquid phase, and examples of the liquid include a liquid material having high or low viscosity and a fluid such as a sol, gel water, other inorganic solvents, an organic solvent, a solution, a liquid resin, liquid metal, or metal melt. The liquid includes not only a liquid as one state of a substance but also one in which particles of a functional material formed of a solid substance such as a pigment or metal particles are dissolved, dispersed, or mixed, in a solvent. Representative examples of the liquid include ink as described in the aforementioned embodiment and liquid crystal. Here, the ink includes general water-based inks and oil-based inks, and various liquid compositions such as gel ink and hot melt ink. Specific examples of the liquid ejecting apparatus include an apparatus that ejects liquid containing, in a dispersed or dissolved manner, a material, such as an electrode material or a coloring material, which is used for, for example, manufacturing a liquid crystal display, an electroluminescent display, a surface emitting display, or a color filter. The liquid ejecting apparatus may be an apparatus that ejects a bioorganic substance used for manufacturing biochips, an apparatus that is used as a precision pipette and ejects liquid serving as a sample, a printing apparatus, or a micro-dispenser, for example. The liquid ejecting apparatus may be an apparatus that ejects lubricant onto a precision machine such as a watch or a camera with pinpoint accuracy or an apparatus that ejects, onto a substrate, a transparent liquid resin such as an ultraviolet curing resin to form, for example, a micro hemispherical lens or an optical lens used in an optical communication element or the like. The liquid ejecting apparatus may be an apparatus that ejects etchant for acid etching, alkaline etching, or the like to etch a substrate or the like.

Technical ideas and effects obtained from the above-described embodiment and modified examples will be described below.

A head lifting lowering device includes: a lifting lowering mechanism that moves a liquid ejecting head, which ejects a liquid, in a first direction in which the liquid ejecting head is lifted/lowered; a frame that supports the lifting lowering mechanism; and an adjusting member that moves the lifting lowering mechanism relative to the frame in a second direction different from the first direction.

According to the configuration, the lifting lowering mechanism moves the liquid ejecting head in the first direction in which the liquid ejecting head is lifted/lowered. The adjusting member moves the lifting lowering mechanism in the second direction. That is, the adjusting member moves the liquid ejecting head in the second direction via the lifting lowering mechanism. Accordingly, it is possible to adjust the position of the liquid ejecting head in the first direction by the lifting lowering mechanism and adjust the position of the liquid ejecting head in the second direction by the adjusting member, thus making it possible to easily adjust the position of the liquid ejecting head in plural directions.

In the head lifting lowering device, the lifting lowering mechanism may include a rail supported by the frame, and the rail may guide, in the first direction, a protrusion provided in the liquid ejecting head.

According to the configuration, the rail that guides the protrusion provided in the liquid ejecting head is supported by the frame. Accordingly, it is possible to increase the dimension of the rail compared with, for example, an instance in which the rail is provided in the liquid ejecting head and in which a protrusion is provided in the frame. A distance by which the liquid ejecting head is able to move is determined in accordance with the dimension of the rail. Thus, it is possible to increase the moving distance of the liquid ejecting head.

In the head lifting lowering device, the rail may have a movable rail and a fixed rail, the fixed rail may be fixed to the frame, and the adjusting member may move the movable rail relative to the frame.

According to the configuration, the adjusting member moves the movable rail relative to the frame. Thus, it is possible to easily adjust the position of the liquid ejecting head compared with an instance in which the adjusting member moves the entire rail.

In the head lifting lowering device, the first direction may include a component of a horizontal direction, the movable rail may include an upper wall and a lower wall that form a moving path on which the protrusion moves, in the movable rail, compared with a first gap between the upper wall and the lower wall in a first end of the moving path, a second gap between the upper wall and the lower wall in a second end opposite to the first end may be great, and the second end may be adjacent to the fixed rail.

According to the configuration, in the movable rail, the second gap in the second end adjacent to the fixed rail is greater than the first gap in the first end. Accordingly, it is possible to smoothly move the protrusion between the movable rail and the fixed rail.

In the head lifting lowering device, the first direction may include a component of a horizontal direction, the movable rail may include an upper wall and a lower wall that form a moving path on which the protrusion moves, a virtual line which extends from a first end of the movable rail to a second end opposite to the first end so as to pass through a center between the upper wall and the lower wall in the second direction may include a first segment, a second segment, and a third segment, the second end may be adjacent to the fixed rail, the first segment may be parallel to the lower wall and couple the first end and a first end point, the second segment may couple the first end point and a second end point, the third segment may be parallel to the lower wall and couple the second end point and the second end, and a gap between the second end point and the lower wall may be greater than a gap between the first end point and the lower wall.

The first direction includes the component of the horizontal direction. The protrusion of the liquid ejecting head thus readily moves along the lower wall of the upper wall and the lower wall. According to the configuration, the first segment and the third segment are parallel to the lower wall, and the gap between the second end point and the lower wall is greater than the gap between the first end point and the lower wall. Accordingly, the lower wall is able to be formed so as to be smoother than the upper wall, enabling a reduction in vibration of the liquid ejecting head moving along the lower wall.

In the head lifting lowering device, the liquid ejecting head may eject the liquid onto a transported medium in a state in which the protrusion is held at a first position and a state in which the protrusion is held at a second position, and the first position and the second position may be located in the movable rail.

According to the configuration, the liquid ejecting head is able to eject liquid onto a medium at plural positions in the movable rail. Accordingly, the result of adjustment performed by the adjusting member is able to be used in a plurality of printing modes.

In the head lifting lowering device, the liquid ejecting head may have a nozzle surface on which a nozzle from which the liquid is ejected is open, and the nozzle surface of the liquid ejecting head in which the protrusion is held at the first position may be parallel to the nozzle surface of the liquid ejecting head in which the protrusion is held at the second position.

By ejecting liquid in a state in which the nozzle surface is parallel to a medium, the liquid ejecting head is able to perform printing on the medium with high quality compared with an instance in which the liquid ejecting head ejects liquid in a state in which the nozzle surface is not parallel to the medium. According to the configuration, the nozzle surface is retained to be parallel even when the liquid ejecting head moves along the movable rail. Accordingly, it is possible to suppress a degradation in printing quality even when the liquid ejecting head ejects liquid onto the medium at plural positions.

The head lifting lowering device may further include a cap that covers a nozzle surface of the liquid ejecting head, and the cap may cover the nozzle surface of the liquid ejecting head in a state in which the protrusion is held by the fixed rail.

Since the liquid ejecting head moves along the movable rail and the fixed rail, it is possible to increase the moving distance of the liquid ejecting head compared with an instance in which the liquid ejecting head moves along only the movable rail. Accordingly, the liquid ejecting head is able to readily leave a position at which the liquid ejecting head ejects liquid onto a medium. According to the configuration, the cap covers the nozzle surface of the liquid ejecting head in the state in which the protrusion is held by the fixed rail. Accordingly, it is possible to easily ensure a space in which the cap covers the nozzle surface.

The head lifting lowering device may further include a wiper that wipes a nozzle surface of the liquid ejecting head, and the wiper may wipe the nozzle surface of the liquid ejecting head in a state in which the protrusion is held by the fixed rail.

According to the configuration, the wiper wipes the nozzle surface of the liquid ejecting head in the state in which the protrusion is held by the fixed rail. Accordingly, it is possible to easily ensure a space in which the wiper wipes the nozzle surface.

In the head lifting lowering device, the lifting lowering mechanism may include a driving gear and a rack that engages the driving gear, the rack may move relative to the driving gear in the first direction in accordance with rotation of the driving gear, teeth of the rack may face the second direction, and the adjusting member may change a position of the rack with respect to the driving gear in the second direction.

According to the configuration, since the rack moves in the first direction, it is possible to easily move the liquid ejecting head in the first direction by providing the rack in the liquid ejecting head. Since the teeth of the rack face the second direction, it is possible to reduce possible disengagement between the driving gear and the rack even when the adjusting member changes the position of the rack in the second direction.

In the head lifting lowering device, a maximum change amount by which the adjusting member changes the position of the rack may be smaller than a maximum height of the teeth.

According to the configuration, since the maximum change amount by which the adjusting member changes the position of the rack is smaller than the maximum height of the teeth of the rack, it is possible to reduce possible disengagement between the driving gear and the rack.

In the head lifting lowering device, a dimension of the rail is greater than a dimension of the liquid ejecting head in the first direction.

According to the configuration, in the first direction, the dimension of the rail is greater than the dimension of the liquid ejecting head. The liquid ejecting head is thereby able to move in the first direction by a distance longer than the dimension of the liquid ejecting head.

In the head lifting lowering device, the lifting lowering mechanism may include a reference member that supports the liquid ejecting head and a movable member that supports the liquid ejecting head and is configured to move relative to the frame, and the adjusting member may move the movable member relative to the reference member.

According to the configuration, the adjusting member moves the movable member relative to the reference member. The adjusting member is thus able to adjust the position of the liquid ejecting head by moving the liquid ejecting head in a circumferential direction around the reference member.

In the head lifting lowering device, the reference member and the movable member may be provided apart from each other in a longitudinal direction of the liquid ejecting head.

According to the configuration, the reference member and the movable member are provided apart from each other in the longitudinal direction of the liquid ejecting head. The adjusting member is thus able to adjust the inclination of the liquid ejecting head in the longitudinal direction by moving the movable member relative to the reference member.

In the head lifting lowering device, the reference member and the movable member may be provided apart from each other in the first direction.

According to the configuration, the reference member and the movable member are provided apart from each other in the first direction. The adjusting member is thus able to adjust the inclination of the liquid ejecting head with respect to the first direction by moving the movable member relative to the reference member.

In the head lifting lowering device, the adjusting member may be provided outside the frame.

According to the configuration, the adjusting member is provided outside the frame. Thus, for example, in an instance in which the head lifting lowering device is arranged at a position at which the head lifting lowering device is exposed by opening a cover provided in a housing, it is possible to easily adjust the position of the liquid ejecting head from outside the housing even when the head lifting lowering device is accommodated in the housing.

In the head lifting lowering device, the lifting lowering mechanism may be provided inside the frame, the adjusting member may include a screw provided outside the frame, and the lifting lowering mechanism may move relative to the frame upon rotation of the screw.

According to the configuration, when the screw provided outside the frame is rotated, the lifting lowering mechanism moves relative to the frame. It is therefore possible to easily adjust the position of the lifting lowering mechanism from outside the frame.

A control method of a head lifting lowering device is a control method of the head lifting lowering device having the aforementioned configuration, the lifting lowering mechanism including a movable rail configured to move relative to the frame and a fixed rail fixed to the frame, and the control method includes: a first moving step of causing the liquid ejecting head to move along the fixed rail; and a second moving step of causing the liquid ejecting head to move along the movable rail successively after the first moving step.

According to the method, the head lifting lowering device performs the second moving step successively after the first moving step. It is thus possible to move the liquid ejecting head by a long distance compared with an instance in which only one of the first moving step and the second moving step is performed.

A non-transitory computer-readable storage medium storing a program that causes a computer to execute the control method of the head lifting lowering device is provided.

According to the aforementioned method, it is possible to achieve an effect similar to that of the head lifting lowering device.

A manufacturing method of a head lifting lowering device is a manufacturing method of the head lifting lowering device having the aforementioned configuration, and the manufacturing method includes: an adjusting step of moving the lifting lowering mechanism relative to the frame in the second direction; and an attaching step of attaching the liquid ejecting head to the lifting lowering mechanism after the adjusting step.

According to the method, after the adjusting step is performed to adjust the position of the lifting lowering mechanism, the liquid ejecting head is attached to the adjusting member. Thus, the lifting lowering mechanism is not necessarily moved, for example, when the liquid ejecting head is replaced, and it is therefore possible to easily replace the liquid ejecting head.

The invention claimed is:

1. A head lifting lowering device, comprising:
 a lifting lowering mechanism that moves a liquid ejecting head, which ejects a liquid, straight in a first direction in which the liquid ejecting head is lifted/lowered, wherein the lifting lowering mechanism includes a first rail and a second rail;
 a frame that supports the lifting lowering mechanism; and
 an adjusting member that moves the first rail relative to the frame in a second direction different from the first direction, wherein
  the second direction is orthogonal to the first direction,
  the first rail and the second rail are supported by the frame,
  the first rail and the second rail each guide, in the first direction, a protrusion provided on the liquid ejecting head,
  the second rail is fixed to the frame,
  the first direction includes a component of a horizontal direction,
  the first rail includes an upper wall and a lower wall that form a moving path on which the protrusion moves, a first gap between the upper wall and the lower wall at a first end of the moving path is smaller than a second gap between the upper wall and the lower wall at a second end of the moving path, first end of the moving path is opposite to the second end of the moving path, and the second end of the moving path is adjacent to the second rail.

2. The head lifting lowering device according to claim 1, wherein a virtual line which extends from a first end of the first rail to a second end of the first rail opposite to the first end of the first rail so as to pass through a center between the upper wall and the lower wall in the second direction includes a first segment, a second segment, and a third segment, the second end of the first rail is adjacent to the second rail, the first segment is parallel to the lower wall and connects the first end of the first rail and a first end point, the second segment connects the first end point and a second end point, the third segment is parallel to the lower wall and connects the second end point and the second end of the first rail, and a third gap between the second end point and the lower wall is wider than a fourth gap between the first end point and the lower wall.

3. The head lifting lowering device according to claim 1, wherein the liquid ejecting head ejects the liquid onto a transported medium in a state in which the protrusion is held at a first position and in a state in which the protrusion is held at a second position, and the first position and the second position are located in the first rail.

4. The head lifting lowering device according to claim 3, wherein the liquid ejecting head has a nozzle surface on which a nozzle from which the liquid is ejected is open, and the nozzle surface of the liquid ejecting head in which the protrusion is held at the first position is parallel to the nozzle surface of the liquid ejecting head in which the protrusion is held at the second position.

5. The head lifting lowering device according to claim 1, further comprising a cap that covers a nozzle surface of the liquid ejecting head, wherein the cap covers the nozzle surface of the liquid ejecting head in a state in which the protrusion is held by the second rail.

6. The head lifting lowering device according to claim 1, further comprising a wiper that wipes a nozzle surface of the liquid ejecting head, wherein the wiper wipes the nozzle surface of the liquid ejecting head in a state in which the protrusion is held by the second rail.

7. The head lifting lowering device according to claim 1, wherein the lifting lowering mechanism includes a driving gear and a rack that engages the driving gear, the rack moves relative to the driving gear in the first direction in accordance with rotation of the driving gear, teeth of the rack face the second direction, and the adjusting member changes a position of the rack with respect to the driving gear in the second direction.

8. The head lifting lowering device according to claim 7, wherein a maximum change amount by which the adjusting member changes the position of the rack is smaller than a height of the teeth.

9. The head lifting lowering device according to claim 1, wherein a sum of a first dimension of a rail that includes the first rail in the first direction and a second dimension of the second rail in the first direction, is longer than a dimension of the liquid ejecting head in the first direction.

10. The head lifting lowering device according to claim 1, wherein the lifting lowering mechanism includes a reference member that supports the liquid ejecting head and a movable member that supports the liquid ejecting head, the movable member is configured to move relative to the frame, and the adjusting member moves the movable member relative to the reference member.

11. The head lifting lowering device according to claim 10, wherein the reference member and the movable member are provided apart from each other in a longitudinal direction of the liquid ejecting head.

12. The head lifting lowering device according to claim 10, wherein the reference member and the movable member are provided apart from each other in the first direction.

13. The head lifting lowering device according to claim 1, wherein the adjusting member is provided outside the frame.

14. The head lifting lowering device according to claim 1, wherein the frame includes a first wall, a second wall, and a beam that couples the first wall and the second wall, the lifting lowering mechanism is provided inside the frame, the adjusting member includes a screw provided outside the frame, the lifting lowering mechanism moves in the second direction upon rotation of the screw.

* * * * *